US010648355B2

(12) United States Patent
Schober et al.

(10) Patent No.: US 10,648,355 B2
(45) Date of Patent: May 12, 2020

(54) TURBINE

(71) Applicant: DEVCON ENGINEERING GERHARD SCHOBER, Vaduz (LI)

(72) Inventors: Werner Schober, Unterpremstaten-Zettling (AT); Gerhard Schober, Eschen (LI)

(73) Assignee: DEVCON ENGINEERING GERHARD SCHOBER, Vaduz (LI)

( * ) Notice: Subject to any disclaimer, the term of this patent is extended or adjusted under 35 U.S.C. 154(b) by 285 days.

(21) Appl. No.: 15/572,268

(22) PCT Filed: May 10, 2016

(86) PCT No.: PCT/IB2016/052669
§ 371 (c)(1),
(2) Date: Nov. 7, 2017

(87) PCT Pub. No.: WO2016/181307
PCT Pub. Date: Nov. 17, 2016

(65) Prior Publication Data
US 2018/0119561 A1   May 3, 2018

(30) Foreign Application Priority Data
May 11, 2015 (CH) ...................... 0643/15

(51) Int. Cl.
*F02C 1/00*         (2006.01)
*F01D 15/10*        (2006.01)
(Continued)

(52) U.S. Cl.
CPC ................ *F01D 15/10* (2013.01); *F02C 1/04* (2013.01); *F02C 3/10* (2013.01); *F02C 3/14* (2013.01);
(Continued)

(58) Field of Classification Search
CPC ...... F02C 5/12; F02C 5/00; F02C 7/08; F02C 7/10; F23R 7/00; F02K 7/02
See application file for complete search history.

(56) References Cited

U.S. PATENT DOCUMENTS 5,635,768 A * 6/1997 Birch .................. H02P 9/48
290/400
6,038,849 A * 3/2000 Nakhamkin .............. F02C 6/06
60/726

(Continued)

FOREIGN PATENT DOCUMENTS

| AT | 506592 A4 | 8/2008 |
| EP | 0462458 B1 | 12/1991 |
| EP | 1270874 B1 | 1/2003 |
| WO | 2003095814 A1 | 11/2003 |

*Primary Examiner* — Gerald L Sung
(74) *Attorney, Agent, or Firm* — Nadya Reingand; Yan Hankin

(57) ABSTRACT

The invention relates to a turbine, in particular a combustion gas turbine, which drives a high-speed generator for generating electricity, said turbine having a high efficiency. The turbine has at least one combustion chamber (6), which is provided with a fuel injection means (7) and an ignition device (8) and which supplies the turbine with a combustion gas. An external compressor (3) is associated with the turbine. Said compressor has a separate electric drive and is not connected to the turbine by means of a drive shaft. Furthermore, at least two combustion chambers (5) are provided for discontinuous, pulsed combustion and supply of the turbine.

19 Claims, 4 Drawing Sheets

(51) Int. Cl.
  *F02C 1/04* (2006.01)
  *F02C 5/02* (2006.01)
  *F02C 3/10* (2006.01)
  *F23R 7/00* (2006.01)
  *F02C 5/00* (2006.01)
  *F02C 3/14* (2006.01)
  *F02C 7/32* (2006.01)
  *F04D 25/06* (2006.01)
  *F04D 27/00* (2006.01)
  *F02C 7/10* (2006.01)
  *F02C 7/22* (2006.01)

(52) U.S. Cl.
  CPC .................. *F02C 5/00* (2013.01); *F02C 5/02* (2013.01); *F02C 7/32* (2013.01); *F04D 25/06* (2013.01); *F04D 27/004* (2013.01); *F23R 7/00* (2013.01); *F02C 7/10* (2013.01); *F02C 7/22* (2013.01); *F05D 2220/32* (2013.01); *F05D 2260/99* (2013.01)

(56) References Cited

U.S. PATENT DOCUMENTS

| | | | |
|---|---|---|---|
| 2002/0139106 A1 | 10/2002 | Meholic | |
| 2003/0010014 A1 | 1/2003 | Bland et al. | |
| 2004/0148922 A1* | 8/2004 | Pinkerton | F02C 1/05 |
| | | | 60/39.6 |
| 2004/0154306 A1 | 8/2004 | Benians | |
| 2006/0005527 A1* | 1/2006 | Kopko | F02C 3/36 |
| | | | 60/39.511 |
| 2006/0053800 A1* | 3/2006 | Orlando | F02C 5/00 |
| | | | 60/772 |
| 2006/0213183 A1* | 9/2006 | Althaus | F01D 25/305 |
| | | | 60/274 |
| 2007/0144179 A1* | 6/2007 | Pinard | F23R 7/00 |
| | | | 60/776 |
| 2009/0102203 A1* | 4/2009 | Lu | F02C 5/12 |
| | | | 290/40 R |
| 2011/0138818 A1* | 6/2011 | Mizukami | F01D 11/24 |
| | | | 60/778 |
| 2013/0001948 A1* | 1/2013 | Lim | F02C 6/16 |
| | | | 290/52 |

* cited by examiner

TURBINE

CROSS REFERENCE TO RELATED APPLICATIONS

The present application is a National stage application from the PCT application PCT/IB2016/052669 filed on May 10, 2016, which claims priority to Swiss application CH 00643/15 filed on May 11, 2015.

TECHNICAL FIELD

The invention relates to a turbine, in particular a combustion gas turbine which drives a high-speed generator for generating current.

BACKGROUND ART

Gas turbines for generating current or generating power are known. Thus, EP0462458B1 discloses a gas turbine of a power generating machine which comprises a compressor, a combustion chamber arranged downstream of the compressor, wherein the turbine is provided downstream of the combustion chamber. The turbine and the compressor are connected by a common shaft. An air-water heat exchanger is used in which the waste gas heat of the turbine is used to generate steam.

A return of the waste gases via air-air transverse-flow heat exchangers is also known wherein compressed air is supplied via the heat exchangers to the combustion space of a combustion chamber. However, a complete transfer in the heat exchanger is not given.

In a gas turbine with a compressor for air according to EP1270874B1, a plurality of combustion chambers connected fluidically in parallel are provided in which air is heated and flows to the gas channel of the turbine via a bridging channel.

AT506592A4 describes a combustion turbine with discontinuous combustion, which has a combustion chamber provided with an ignition device, wherein a turbine is arranged downstream of the combustion chamber to which working gas contained in the combustion container can be supplied. The combustion chamber is arranged about the axis of rotation of the turbine.

Located between the combustion chamber and the turbine is a through-flow chamber which is delimited from the combustion chamber by a flow plate or by another turbine. The air can be supplied in a clocked manner by valves in the through-flow chamber.

US2004154306A discloses a composite gas turbine with a compressor and a turbine which are arranged on an axis. The composite gas turbine should enable a higher pressure and a higher operating temperature during operation for which phase-shifted cycles should be produced in the combustion chambers. Some of the combustion gases of one combustion chamber should be supplied to the next so that a mixed charge is formed in the next combustion chamber. This transfer of some of the combustion gases should be made in turn which should then result in a higher turbine power.

For example, US2003010014A, US2002139106A and WO03095814A disclose further gas turbines in which compressor and turbine are arranged on or in one axis.

SUMMARY

The object of the invention consists in providing a turbine which in turn drives a high-speed generator for generating current which has a higher efficiency and which has a simple and variable structure compared with the prior art.

The object is solved by the features of patent claim 1.

According to the invention, the turbine is assigned at least one external compressor which is provided with its own electric drive and which is not connected by a drive shaft or the like to the turbine. At least two combustion chambers are provided for discontinuous pulsed combustion or supply of the turbine.

The turbine can be an axial combustion gas turbine or also a radial combustion gas turbine.

Preferred embodiments of the invention are disclosed in the dependent claims.

The plurality of combustion chambers are arranged so that their outflow nozzles are directed directly onto the turbine wheel which results in a nozzle effect of the combustion. Each combustion chamber is provided with a fuel injection means, an ignition device and an outflow nozzle. A fuel is injected into the combustion chamber in gaseous or liquid form and made to explode by means of the ignition device. As a result, an approximately isochoric combustion is achieved (isochoric requires that the volume is constant). The nozzle at the outlet of the combustion chamber converts the generated pressure into a flow rate by means of which the turbine is supplied. The combustion chambers are brought close to one another for ignition.

Preferably at least two or more, for example up to six or even more combustion chambers can be provided.

Further preferably, the combustion chambers are arranged uniformly spaced apart from one another on the circumference of the turbine.

For regulating the power of the turbine, the frequency of the ignition sequence can be adjusted and regulated by means of an electronic controller.

Preferably the electric drive is a controllable high-speed electric drive.

A second external compressor can be provided which is also provided with its own controllable high-speed electric drive. Alternatively the second external compressor can also be connected to the controllable high-speed electric drive of the first compressor.

Furthermore, the compressor flows of the compressors can be supplied to the turbine via a divided conducting device independently of one another.

As a result of the external compressor or compressors, the turbine can be started with the compressor air and the rotational speed of the turbine can be efficiently influenced and delimited. The compressor can also be configured as a double compressor.

Advantageously the turbine is connected to a counterflow heat exchanger through which the waste gas flow of the turbine can be guided. The counterflow heat exchanger can be connected to the second external compressor in such a manner that the thermal energy of the waste gas flow can be transferred to the compressor air of the second compressor.

In order to increase the turbine efficiency, by means of the second compressor which is either coupled to the first compressor or provided with its own electric controllable high-speed electric drive, the thermal energy of the waste gas flow is returned directly into the turbine via a counterflow heat exchanger. The return of the waste gas flow into the turbine is preferably made possible by a fluidically divided conducting device upstream of the turbine wheel. The turbine wheel is advantageously supplied by two separate compressor turbine air flows. The combustion energy is supplied to the air flow from the first compressor and the energy from the waste gas flow is supplied to the air flow from the second compressor. The thermal energy from the waste gas flow is transferred via the heat exchanger to the compressor air and supplied to the turbine.

High-speed in the sense of the invention relates to rotational speeds above 10,000 rpm. According to the invention, the generator rotational speed can be about 50,000 rpm or more. The higher the rotational speed, the smaller the generator can be designed.

The turbine according to the invention can be controlled by means of a control unit according to an efficiency curve. As a result of the independent controllability of the compressor, the pulse intensity of the combustion, the acknowledgement of data of the heat exchanger and the power reduction of consumers, it is possible to control the turbine according to an efficiency curve. This enables optimal operation of the turbine. Compared to the prior art, it can be operated for much longer and efficiently in different load ranges which results in a lower fuel consumption and lower emissions.

Further advantages, features and details of the invention are obtained from the following description in which exemplary embodiments of the invention are described with reference to the drawings. The features mentioned in the claims and in the description can each be essential to the invention individually by themselves or in any combination.

The reference list and also the technical content of the patent claims and figures are part of the disclosure. The figures are described in a cohesive and overlapping manner. The same reference numbers denote the same components, reference numbers with different indices give functionally the same or similar components.

DETAILED DESCRIPTION OF THE PREFERRED EMBODIMENTS

Figure 1:
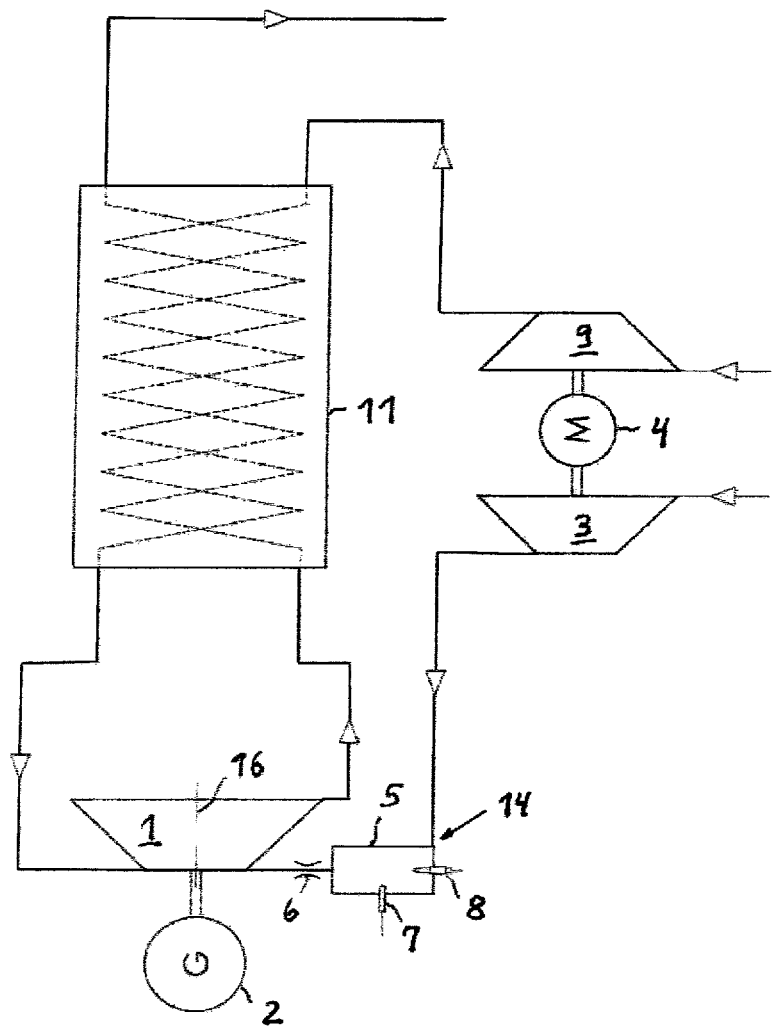
FIG. 1 shows a first embodiment of a turbine according to the invention.

FIG. 1 shows a turbine according to the invention for the example of an axial combustion gas turbine 1 for driving a high-speed generator 2 having two external compressors 3, 9. The compressors 3, 9 are not connected by a shaft or the like to the axial combustion gas turbine 1 but are provided with their own controllable high-speed electric drive 4.

Figure 4:
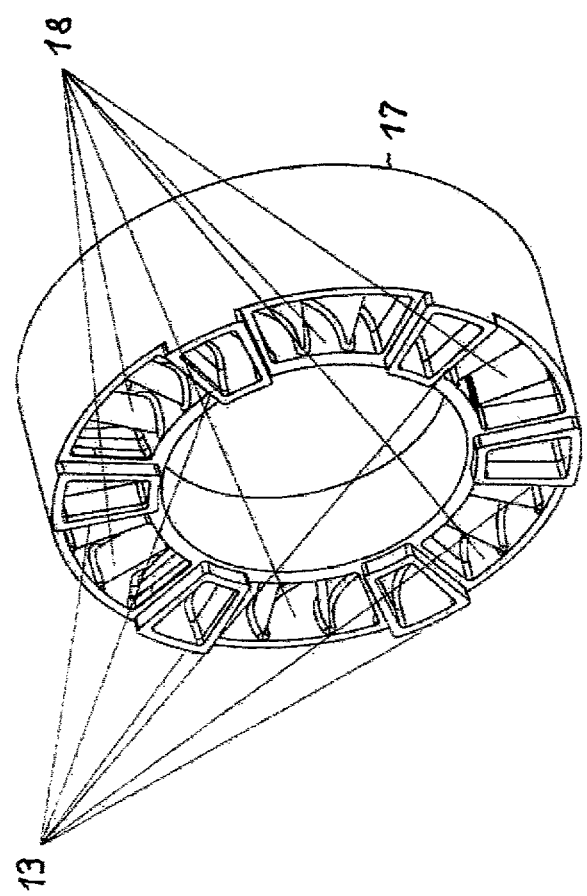
FIG. 4 shows a conducting device for the compressor air.

Another feature is the non-continuous combustion by means of a plurality of combustion chambers 5 which are arranged so that their outflow nozzles 6 are aligned directly onto the turbine wheel 12, i.e. the turbine blades of the turbine wheel 12 are supplied parallel to the axis of rotation 16. At least two combustion chambers 5 are arranged but preferably in the example described six combustion chambers 5 which are arranged uniformly spaced apart from one another on the circumference of the axial combustion gas turbine 1 (FIG. 4).

Each combustion chamber 5 is provided with a fuel injection means 7, an ignition device 8 and an outflow nozzle 6. Fuel is injected into the combustion chamber 5 in a gaseous or liquid manner and brought to explode by means of the ignition device 8. As a result, an approximately isochoric combustion is achieved. The outflow nozzle 6 at the outlet of the combustion chamber 5 "converts" the generated pressure into a flow rate by means of which the turbine wheel 12 is supplied.

The combustion chambers 5 are successively brought to ignition by means of a controller not shown explicitly. In order to control the power of the axial combustion gas turbine 1, the frequency of the ignition sequence can be adjusted and regulated by means of the electronic controller.

In order to increase the turbine efficiency, the thermal energy of the waste gas flow is returned directly into the axial combustion gas turbine 1 by means of the second compressor 9 which is coupled to the first compressor 3 via a counterflow heat exchanger 11. The return into the axial combustion gas turbine 1 is made possible by a fluidically divided conducting device 17 upstream of the turbine wheel 12.

The turbine wheel 12 is supplied by two separate compressor air flows. The combustion energy is supplied to the air flow from the first compressor 3 and the energy from the waste gas flow is supplied to the air flow from the second compressor 9. The thermal energy from the waste gas flow is transferred via the counterflow heat exchanger 11 to the compressor air of the second compressor 9 and the axial combustion gas turbine 1.

Pipelines for flowing gases are shown in simplified form and giving the flow direction (arrow direction).

The second compressor 9 is required for use of the waste gas heat. However, it is also conceivable that the compressor air is divided by a compressor. There are also two-stage compressors. The separate compressor drives are a preferred variant since an efficient control of the turbine is thereby possible.

An axial combustion gas turbine 1 with external compressor is not known from the prior art. As a result of the external compressor or compressors 3, 9, the axial combustion gas turbine 1 can be started with compressor air and the rotational speed of the axial combustion gas turbine 1 can be efficiently influenced and delimited.

Figure 2:
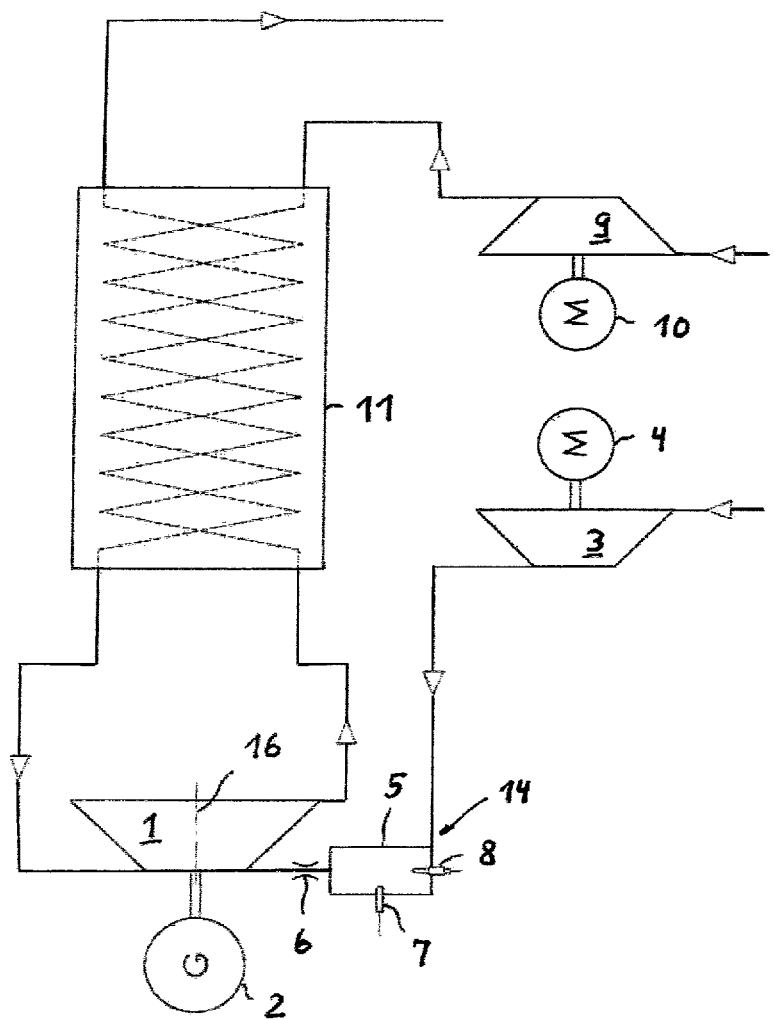
FIG. 2 shows a second embodiment of the turbine according to the invention.

In contrast to the first embodiment according to FIG. 1, FIG. 2 shows a variant in which the second external compressor 9 is provided with its own controllable high-speed electric drive 10. The separate compressor drives form a preferred variant since a more efficient control of the axial combustion gas turbine 1 is thereby possible.

Figure 3:
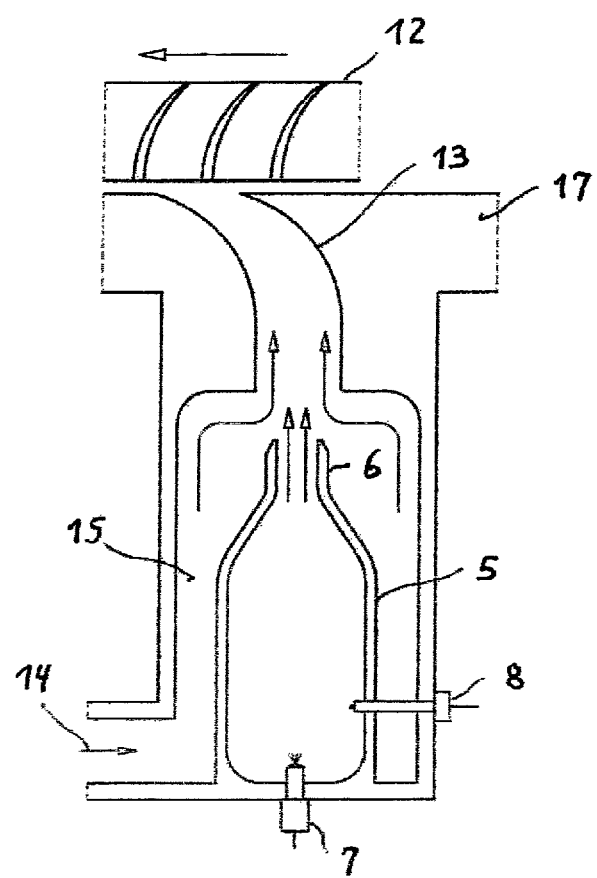
FIG. 3 shows a combustion chamber of the turbine according to the invention.

FIG. 3 shows details of the combustion chamber 5 and a conducting device 17 surrounding it. The combustion chamber 5 is in this case integrated into a pre-chamber 15. The compressor air 14 flows permanently through the pre-chamber 15 and drives the turbine wheel 12. Fuel is injected into the combustion chamber 5 via the fuel nozzle 8 and brought to explode by the ignition device 7. The expansion discharges through the outflow nozzle 6 directly into a channel 13 (nozzle effect) of the conducting device 17 and additionally drives the turbine wheel 12.

In the axial combustion gas turbine 1 according to the invention, the plurality of combustion chambers 5 are arranged so that they are always successively brought to ignition in the same sequence, in adjustable time intervals. The sequences in the combustion chamber such as the injection quantity and the ignition time are variably controllable. The time intervals between the ignitions of the individual combustion chambers are also variably controllable. The power of the turbine is regulated by the variable injection quantity and the combustion chamber ignition sequence.

As can be seen from FIG. 3, no insurances against a blowback of air or combustion gas are provided and also are not necessary. Each combustion chamber 5 has air from the first compressor 3 continuously flowing around it and the expansion pressure of the combustion gases of the combustion chamber 5 is converted by the outflow nozzle 6 into flow rate.

The axial combustion gas turbine 1 according to the invention is primarily started by the compressor air. The compressors 3, 9 are designed so that the nominal rotation speed of the axial combustion gas turbine 1 is achieved by the compressors 3, 9. In addition, e.g. for assisting the starting of the axial combustion gas turbine 1, this can be started by the high-speed generator 2 operated as a motor. The fuel consumption is only required for operation of the axial combustion gas turbine 1.

FIG. 4 shows a conducting device 17 in which the compressor air and also the combustion gases are supplied via the guide vanes 18 to the turbine wheel 12 which is arranged downstream of the conducting device 17. The compressor air from the second compressor 9 is supplied to the turbine wheel 12 via the guide vanes 18. The regions of the conducting device 17 shown are fluidically completely separated. In the conducting device 17, in the example six combustion chambers 5 are provided, i.e. the compressor air only flows into the guide vanes 18 via the six combustion chambers 5 and the pre-chambers 15 thereof and acts upon the turbine wheel 12.

In principle, the same thermodynamic conditions apply to both compressor circuits. The pressure produced by the compressor 3, 9 remains constant, only the volume is increased due to the heating. The fluid relaxes over the axial combustion gas turbine 1, with the result that a pressure increase is not possible. The independent compressor circuits (compressor circuits) function in the same way, only the respective heat source is a different one.

It is important that the two compressor circuits are supplied separately to the axial combustion gas turbine 1 in order to avoid mutual influences.

In the second drive train it is therefore prevented that the heat introduced through the counterflow heat exchanger 11 does not result in any expansion in the pressure line which could have a braking effect on the compressor 9 of the second drive train.

For the high-speed generator 2 and the high-speed drives 4, 10, an inverter developed for this application is used which supplies the high-frequency generator current, via an intermediate circuit, the high-speed drives 4, 10 and the turbine controller and converts the remaining current into consumer voltage.

An electronic controller is used for regulating the axial combustion gas turbine 1, which calculates the optimal power via sensors for temperature, pressure and rotational speed and the data from the inverter.

In the case of turbines, which use high-speed drives, an inverter is necessary. Since a high-frequency high voltage is produced due to the high rotational speed of the generator, this must be converted into a low-frequency consumer voltage. This is accomplished by means of an inverter. Since high-speed drives according to the invention are used for the drive of the compressor 3, 9, it is not appropriate to use commercially available inverters which convert the consumer voltage into a high-frequency voltage. Thus, an inverter with a so-called intermediate circuit is provided for the high-speed drives 4, 10. Due to the inverter according to the invention, it is possible to use the high-frequency voltage directly from the generator 2.

The efficiency of the turbine according to the invention is increased considerably compared with previously known solutions.

REFERENCE LIST

1 Axial combustion gas turbine
2 High-speed generator
3 Compressor
4 High-speed electric drive
5 Combustion chamber
6 Outflow nozzle
7 Fuel injection means
8 Ignition device
9 Compressor
10 High-speed electric drive
11 Counterflow heat exchanger
12 Turbine wheel
13 Channel
14 Compressor air
15 Pre-chamber
16 Axis of rotation
17 Conducting device
18 Guide vanes

What is claimed is:

1. A combustion gas turbine, said combustion gas turbine comprising: a turbine wheel, at least one pulse detonation engine (PDE) combustion chamber (5) provided with a fuel injection means (7) and an ignition device (8), said at least one PDE combustion chamber supplying the turbine wheel with a combustion gas to drive a high-speed generator (2), said high-speed generator generating a current, at least one first external compressor and at least one second external compressor, and at least one electric drive motor, wherein the at least one first external compressor provides air to the at least one PDE combustion chamber, and wherein the at least one second external compressor provides air to an inlet of the turbine wheel, said inlet of the turbine wheel further containing the combustion gas from the at least one PDE combustion chamber.

2. The combustion gas turbine according to claim 1, wherein the at least one electric drive motor is a controllable high-speed electric drive motor.

3. The combustion gas turbine according to claim 1, wherein the at least one PDE combustion chamber comprises up to six PDE combustion chamber.

4. The combustion gas turbine according to claim 3, wherein the up to six PDE combustion chambers are arranged uniformly spaced apart from one another on a circumference of the combustion gas turbine.

5. The combustion gas turbine according to claim 1, wherein the at least one first external compressor or the at least one second external compressor is configured as a double compressor.

6. The combustion gas turbine according to claim 1, wherein the at least one second external compressor is connected to a separate controllable high-speed electric drive motor.

7. The combustion gas turbine according to claim 1, wherein airflows from the at least one first external compressor and the at least one second external compressor are supplied independently to the turbine wheel via a divided conducting device.

8. The combustion gas turbine according to claim 1, wherein the combustion gas turbine is connected to a counterflow heat exchanger through which a waste gas flow of the combustion gas turbine is guided.

9. The combustion gas turbine according to claim 1, where a counterflow heat exchanger is connected to the at least one second external compressor such that thermal energy from waste gas flowing from the combustion gas turbine is transferred to compressor air of the at least one second external compressor.

10. The combustion gas turbine according to claim 1, wherein the at least one second external compressor is connected to the electric drive motor.

11. The combustion gas turbine according to claim 2, wherein an inverter with an intermediate circuit is provided for regulating the at least one controllable high-speed electric drive motor.

12. The combustion gas turbine according to claim 1, wherein the at least one first external compressor and the at least one second external compressor are controlled independently of one another by means of a control unit, and wherein the combustion gas turbine is controlled according to an efficiency curve.

13. A method for operating the combustion gas turbine according to claim 1 by means of pulsed and approximately isochoric combustion of a fuel in the at least one PDE combustion chamber, said at least one PDE combustion chamber comprising two PDE combustion chambers in adjustable time intervals, wherein the turbine wheel of the combustion gas turbine is supplied by two separate compressor air flows and thermal energy of a waste gas flow is returned directly into the combustion gas turbine and wherein the combustion gas turbine is controlled according to an efficiency curve.

14. The combustion gas turbine according to claim 2, wherein the at least one PDE combustion chamber comprises up to six PDE combustion chambers.

15. The combustion gas turbine according to claim 14, wherein the up to six PDE combustion chambers are arranged uniformly spaced apart from one another on a circumference of the combustion gas turbine.

16. The combustion gas turbine according to claim 2, wherein the at least one second external compressor is configured as a double compressor.

17. The combustion gas turbine according to claim 3, wherein the at least one second external compressor is configured as a double compressor.

18. The combustion gas turbine according to claim 4, wherein the at least one second external compressor is configured as a double compressor.

19. The combustion gas turbine according to claim 2, wherein the at least one second external compressor is connected to a separate controllable high-speed electric drive motor.

* * * * *